United States Patent
Dahl et al.

[11] Patent Number: 5,163,788
[45] Date of Patent: Nov. 17, 1992

[54] ROTARY SLOTTING TOOL HAVING STAGGERED CUTTING ELEMENTS

[75] Inventors: Gary Dahl, Troy; Lawrence J. Plutschuck, Warren, both of Mich.

[73] Assignee: GTE Valenite Corporation, Troy, Mich.

[21] Appl. No.: 639,601

[22] Filed: Jan. 10, 1991

[51] Int. Cl.$^5$ .............................................. B26D 1/12
[52] U.S. Cl. ........................................ 407/46; 407/101
[58] Field of Search .............................. 407/33, 46–48, 407/51, 67, 68, 99, 101, 40, 104, 76, 42

[56] References Cited

U.S. PATENT DOCUMENTS

| | | | |
|---|---|---|---|
| 3,405,433 | 10/1968 | Williams | 407/40 |
| 3,818,562 | 6/1974 | Lacey | 407/48 X |
| 4,066,376 | 1/1978 | Eckle et al. | 407/101 |
| 4,393,735 | 7/1983 | Eckle et al. | 407/46 X |

Primary Examiner—Larry I. Schwartz
Assistant Examiner—Julie R. Daulton
Attorney, Agent, or Firm—Bill C. Panagos

[57] ABSTRACT

A rotary slotting tool that includes a circular tool body having a V-shaped groove in its peripheral edge to establish a centering plane for individual cutter element holders. A pocket is formed in the leading face of each holder for mounting an individual cutter element. The pocket structure configuration is varied between successive holders so that successive cutter elements overhang different side faces of the associated holders. A common cutter element configuration is used for all of the cutter elements.

7 Claims, 1 Drawing Sheet

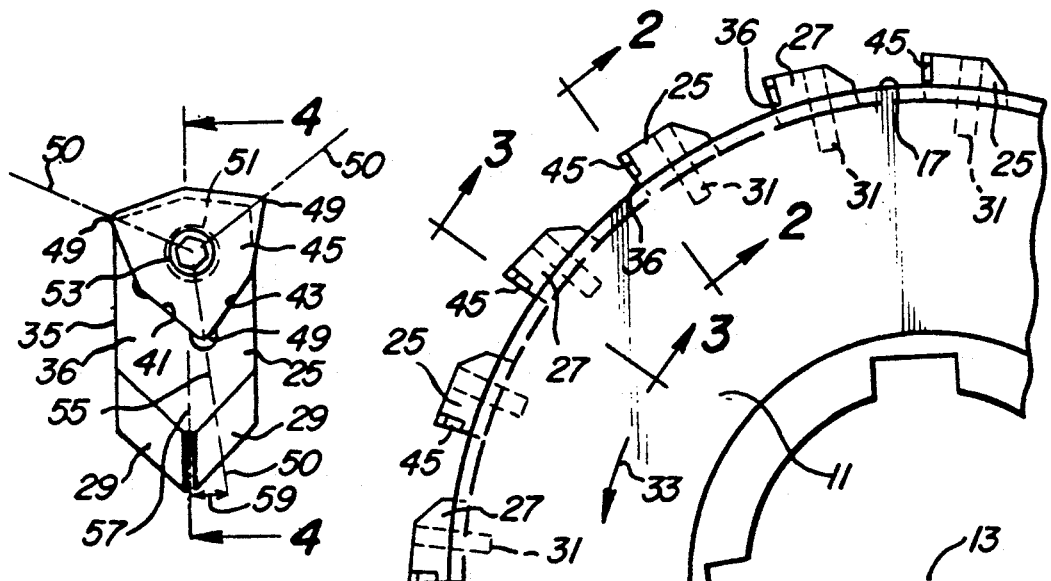
Fig-1
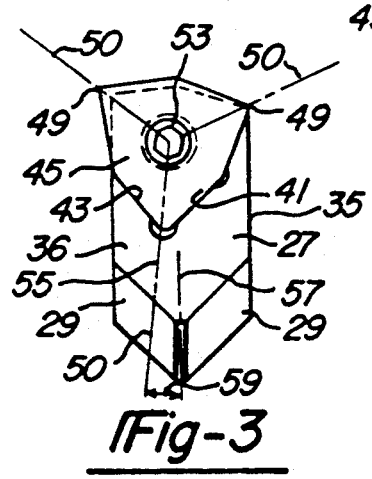
Fig-2
Fig-3
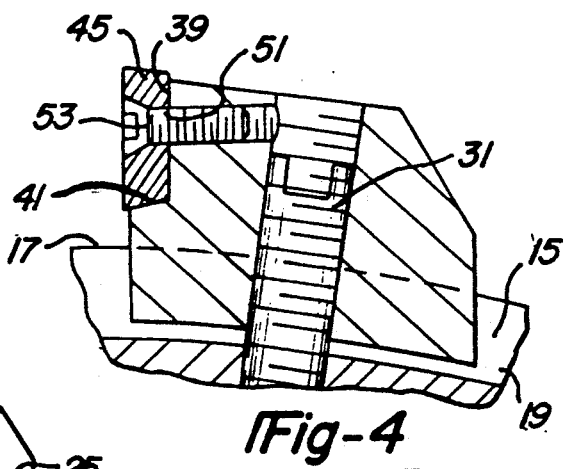
Fig-4
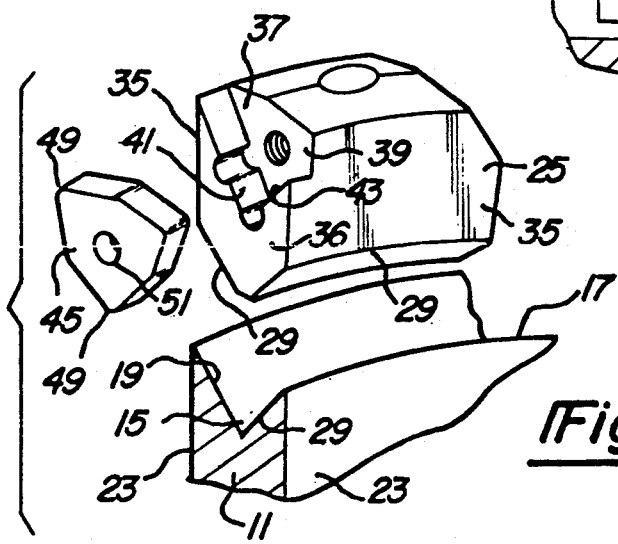
Fig-5

ROTARY SLOTTING TOOL HAVING STAGGERED CUTTING ELEMENTS

BACKGROUND OF THE INVENTION

1. Field of the Invention

This invention relates to a rotary slotting tool that comprises a circular tool body having a series of individual cutter elements spaced around its peripheral edge. The cutter elements are individually removable from the tool body of replacement purposes.

2. Description of the Prior Developments

U.S. Pat. No. 3,405,433 to T. Williams shows a rotary slotting tool that is comprised of a circular tool body having a V-shaped groove in its outer peripheral edge (FIG. 5 of the Williams patent). Individual cutter elements have corner areas thereof seated in the V-shaped groove so that successive cutter elements can accurately track one another. One disadvantage of the patented arrangement is that the cutting edge on each cutter element follows precisely in the same path as the preceding cutter element such that the depth of the cut is somewhat limited.

U.S. Pat. No. 2,914,838 to H. Robinson shows a slotting tool comprised of a circular tool body having a rectangular groove in its outer peripheral edge. Individual cutter elements have tongues fitting into the groove at circumferentially spaced points around the tool body; spacer blocks are fitted between the trailing and leading faces of successive cutter elements for clamping the cutter elements to the tool body. The Robinson patent shows a cutter element arrangement wherein successive cutter elements are offset in different directions from the midplane of the tool body, so as to overhang different side faces of the tool body.

In each of these two patented arrangements the individual cutter elements are seated directly in an endless peripheral groove formed in the circular tool body. To offset or stagger successive cutting elements it is necessary to vary the cutter element configuration, i.e. one cutter element configuration to achieve an offset in one direction, and a different cutter element configuration to achieve an offset in the other direction.

SUMMARY OF THE INVENTION

The present invention is directed to a slotting tool comprised of a circular tool body having a series of individual cutter elements located at circumferentially spaced points around its peripheral edge. A V-shaped groove is formed on the peripheral edge of the circular tool body for accurately spacing the cutter elements from the tool body axis and also for accurately locating the cutter elements relative to the axial midplane of the tool body. However, the individual cutter elements are not seated directly in the peripheral groove. Instead, each cutter element is mounted on a holder that is seated in the V-shaped groove. Successive holders are differently configured so that the associated cutter elements are offset or staggered in different directions relative to the midplane of the tool body. With this arrangement a common cutter element configuration can be used for all of the cutter elements.

This represents an economic advantage. Also, by supporting the cutter elements in individual holders the cutter element configuration does not have to be compromised. When the cutter elements are seated in a peripheral groove of the tool body each cutter element has to conform to the shape of the groove, which can have an adverse effect on cutter element performance.

IN THE DRAWINGS

FIG. 1 is a fragmentary plan view of a rotary slotting tool embodying this invention.

FIG. 2 is an end view of a holder and cutter element used in the FIG. 1 tool FIG. 2 is taken on line 2—2 in FIG. 1.

FIG. 3 is an end view of another holder-cutter element combination used in the FIG. 1 tool. FIG. 3 is taken on line 3—3 in FIG. 1.

FIG. 4 is a fragmentary sectional view taken on line 4—4 in FIG. 2.

FIG. 5 is a perspective view of the FIG. 2 structure, showing the holder and cutter element in an exploded condition dissociated from a circular tool body.

DETAILED DESCRIPTION OF A PREFERRED EMBODIMENT OF THE INVENTION

The drawings show a rotary slotting tool that comprises a circular tool body 11 having a rotation axis 13. An endless V cross-sectional groove 15 extends along and around the circular edge 17 of the tool body to define two convergent groove surfaces 19 and 21. In a typical tool construction, tool body 11 would have a diameter of about eight and one half inches. The axial thickness of tool body 11 would be about 0.3 inch; the central hub area of the tool body would be axially thickened for connection to a milling machine, not shown. V groove 15 is centered on the midplane of the tool body so that the apex of the V is located equidistant from side faces 23 of the tool body.

V groove 15 acts as a mounting mechanism for a series of individual cutter element holders 25 and 27 spaced around the edge of tool body 11. In a typical construction there would be twenty holders equidistantly spaced around the tool body. Each holder has two convergent mounting surfaces 29 adapted to seat flatwise against surfaces 21 of groove 15. A clamping bolt 31 extends through each holder into a radial hole in circular body 11 to clamp the holder to the tool body. Each holder can be individually removed from tool body 11 without disturbing the other holders. V groove 15 acts as a common centering device for all of the holders, such that the midplane of each holder coincident with the midplane of the groove. Side faces 35 of each holder 25 or 27 will- be coplanar with side faces 23 of tool body 11.

Tool body 11 is designed for rotation in the arrow 33 direction (FIG. 1). The leading face 36 of each holder 25 or 27 has a pocket 37 formed therein. Each pocket has a rear face 39 and two angulated side faces 41 and 43 extending from the leading face of the holder to the pocket rear face.

A cutter element 45 is adapted for removable disposition in each pocket 37. All of the cutter elements have the same configuration-. However the pocket configurations on successive cutter element holders are different, such that successive cutter elements are staggered or offset in different directions. FIG. 2 shows a cutter element oriented so that a cutting tip thereof overhangs (extends beyond) the right side face of holder 25. FIG. 3 shows a cutter element oriented so that a cutting tip thereof overhangs the left side face of holder 27.

Each cutter element 45 has three cutting tips 49 spaced equidistant from the axis of a mounting hole 51 extending through the cutter element. The three cutting tips are circumferentially spaced from each other by a distance of one hundred twenty degrees; imaginary radial lines 50 extend from the axis of mounting hole 51 to indicate the circumferential orientations of the cutting tips. Edge areas of the cutter element (between tips 49) are sharpened for achievement of a cutting operation when tool body 11 is rotated in the arrow 33 direction. Each cutter element 45 is clamped to the associated holder 27 by means of a single clamp screw 53.

Cutting tips 49 are symmetrical, such that cutter element 45 is selectively positionable in a given pocket 37 with any one of the three cutting tips overhanging a side face 35 of the associated holder 25 or 27. The service life of the cutter element can by increased by re-orienting the cutter element in the pocket.

An important feature of the present invention is the orientation of pocket side faces 41 and 43. These side faces are angulated to each other to define a V-shaped cavity having a central axis (or bisection line) 55 extending through the axis of clamp screw 53. Each axis line 55 extends at an acute angle to the midplane 57 of the associated holder 25 or 27. Numeral 59 indicates the angulation. In the illustrated construction this angulation is about eight degrees.

Angulations 59 for successive holders 25 and 27 are in different directions so that one angulation is the mirror image of the next angulation (using midplane 57 as the mirror). By thus angling the side faces 41 and 43 of successive pockets 37 in different directions it is possible to achieve a desired staggering of the -cutter elements event though the individual cutter elements have the same configuration.

It will be noted from FIG. 4 that each cutter element 45 is spaced radially outwardly from the edge of tool body 11. Any given cutter element can thereby be removed from the associated holder 25 or 27 without disturbing that holder or any other holder in the system.

The drawings necessarily show one particular form that the invention can take. However, it will be appreciated that the invention can be practiced in other forms and configurations.

What is claimed is:

1. A rotary slotting tool, consisting of a circular tool body having a rotation axis, and an endless circular peripheral edge centered on said axis; an endless V cross-sectioned groove formed in said peripheral edge to define two convergent groove surfaces; individual cutter element holders seated in said groove at circumferentially spaced points therealong, each cutter element holder having two convergent mounting surfaces seated flatwise on the convergent groove surfaces whereby all of the cutter element holders are centered in the groove so that the midplane of each holder is coincident with the midplane of the groove; each holder having two side faces and a leading face measured in the direction of tool body rotation; a pocket formed in the leading face of each holder, each pocket having a rear face and a number of angulated side faces extending from the holder front face to the pocket rear face; a cutter element seated in each pocket; and a clamp screw extending through each cutter element into each cutter element's holder on an axis that is essentially normal to the pocket rear face; the angulated side faces of the pockets on successive holders being oriented differently in relation to the clamp screw axes, whereby successive cutter elements overhang different cutter elements of the holder side faces.

2. The tool of claim 1, wherein each cutter element is spaced radially outwardly from the edge surface of the tool body, whereby any individual cutter element can be removed from its associated holder without disturbing that holder.

3. The tool of claim 1, wherein each cutter element comprises a flat cutter plate having three cutting tips equidistantly spaced from the clamp screw axis; said cutting tips having a circumferential spacing of one hundred twenty degrees measured around the clamp screw axis, so that the cutter element is selectively positionable in each cutter elements associated pocket with any one of the three cutting tips overhanging a holder side face.

4. The tool of claim 1, wherein each cutter element comprises a flat cutter plate having three cutting tips equidistantly spaced from the clamp screw axis; each said cutter element being selectively positionable in each cutter element's pocket so that any one of the three cutting tips overhands a holder side face.

5. The tool of claim 4, wherein the angulated side faces of each pocket define a V-shaped cavity; the central axis of each V-shaped cavity extending through the associated clamp screw axis.

6. The tool of claim 5, wherein the axis of each V-shaped cavity extends at an acute angle to the midplane of the associated holder; the angulations of the cavity axes for successive holders having mirror image orientations to enable successive cutter elements to overhand different cutter elements of the holder side faces.

7. The tool of claim 4, wherein the axis of each V-shaped cavity is angled to the midplane of the associated holder at an angle of about eight degrees.

* * * * *